US009588986B2

(12) United States Patent
Haustein et al.

(10) Patent No.: US 9,588,986 B2
(45) Date of Patent: *Mar. 7, 2017

(54) METHOD AND SYSTEM FOR BACKUP AND RECOVERY

(71) Applicant: INTERNATIONAL BUSINESS MACHINES CORPORATION, Armonk, NY (US)

(72) Inventors: Nils Haustein, Mainz (DE); Thorsten Krause, Mainz (DE); Harald Seipp, Mainz (DE); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,371

(22) Filed: Feb. 24, 2016

(65) Prior Publication Data
US 2016/0196262 A1    Jul. 7, 2016

Related U.S. Application Data

(63) Continuation of application No. 14/589,126, filed on Jan. 5, 2015, now Pat. No. 9,311,193, which is a (Continued)

(30) Foreign Application Priority Data
Jan. 2, 2012    (EP) .................................... 12150010

(51) Int. Cl.
G06F 17/30    (2006.01)
G06F 11/14    (2006.01)

(52) U.S. Cl.
CPC ...... *G06F 17/3023* (2013.01); *G06F 11/1448* (2013.01); *G06F 11/1469* (2013.01); *G06F 17/30008* (2013.01)

(58) Field of Classification Search
CPC ......... G06F 17/30144; G06F 17/30162; G06F 17/30592; G06F 11/1448; G06F 11/1469; (Continued)

(56) References Cited

U.S. PATENT DOCUMENTS 6,088,693 A    7/2000 Van Huben et al.
6,088,694 A    7/2000 Burns et al.
(Continued)

OTHER PUBLICATIONS

Suparna Bhattacharya et al.—"Coordinating Backup/Recovery and Data Consistency Between Database and File Systems"—ACM SIGMOD '2002, Jun. 4-6, 2002, Madison, Wisconsin, USA. Copyright 2002 ACM—Proceeding SIGMOD '02 Proceedings of the 2002 ACM SIGMOD international conference on Management of data—pp. 500-511.*

(Continued)

Primary Examiner — Anh Ly
(74) Attorney, Agent, or Firm — Griffiths & Seaton PLLC

(57) ABSTRACT

For data backup and recovery based on linked file repositories with each of the linked file repositories representing an individual file system capable of storing at least one version of a file and being connected to at least one server system, each of the linked file repositories are placed in a certain position for storing a certain version of the file. Each position of each of the linked file repositories is continuously numbered. A number of the versions of the file are determined by the position of the one of the linked file repositories.

18 Claims, 7 Drawing Sheets

Related U.S. Application Data continuation of application No. 13/718,542, filed on Dec. 18, 2012, now Pat. No. 8,996,566.

(58) Field of Classification Search
 CPC ......... G06F 17/30008; G06F 17/3023; G06F 17/30; G06F 17/30289; G06F 17/30356; G06F 17/30887; G06F 3/0641; G06F 3/0619; G06F 17/3008; G06F 11/14; G06F 3/067; G06F 11/1412; Y10S 707/99934
 See application file for complete search history.

(56) References Cited

U.S. PATENT DOCUMENTS

| | | | |
|---|---|---|---|
| 6,094,654 A | 7/2000 | Van Huben et al. | |
| 6,353,878 B1* | 3/2002 | Dunham | G06F 11/1456 711/112 |
| 6,366,987 B1* | 4/2002 | Tzelnic | G06F 11/1451 711/112 |
| 6,453,325 B1 | 9/2002 | Cabrera et al. | |
| 6,564,215 B1* | 5/2003 | Hsiao | G06F 11/1469 707/E17.005 |
| 6,868,497 B1 | 3/2005 | Levy | |
| 6,874,001 B2* | 3/2005 | Narang | G06F 17/30551 707/E17.014 |
| 7,096,342 B2 | 8/2006 | Chiu et al. | |
| 7,353,541 B1 | 4/2008 | Ishibashi et al. | |
| 7,386,663 B2 | 6/2008 | Cousins | |
| 7,600,075 B2 | 10/2009 | Cousins | |
| 7,774,315 B1 | 8/2010 | Galker | |
| 7,818,299 B1* | 10/2010 | Federwisch | G06F 11/2066 707/620 |
| 7,836,043 B2 | 11/2010 | Jensen et al. | |
| 7,925,623 B2 | 4/2011 | Therrien et al. | |
| 7,937,528 B2 | 5/2011 | Cousins | |
| 8,001,084 B2 | 8/2011 | Liedes et al. | |
| 8,099,572 B1 | 1/2012 | Arora et al. | |
| 8,352,431 B1* | 1/2013 | Protopopov | G06F 17/30082 707/640 |
| 8,621,166 B1* | 12/2013 | Chatterjee | G06F 11/1435 711/162 |
| 8,769,127 B2 | 7/2014 | Selimis et al. | |
| 2002/0147938 A1 | 10/2002 | Hamilton, II et al. | |
| 2003/0069902 A1 | 4/2003 | Narang et al. | |
| 2003/0079133 A1 | 4/2003 | Breiter et al. | |
| 2003/0182312 A1* | 9/2003 | Chen | G06F 11/1435 714/E11.136 |
| 2003/0182322 A1* | 9/2003 | Manley | G06F 17/30212 707/E17.01 |
| 2003/0182330 A1 | 9/2003 | Manley et al. | |
| 2004/0103315 A1 | 5/2004 | Cooper et al. | |
| 2004/0153761 A1* | 8/2004 | Lee | G06F 11/1451 714/15 |
| 2005/0015471 A1 | 1/2005 | Zhang et al. | |
| 2005/0187983 A1 | 8/2005 | Narang et al. | |
| 2006/0112151 A1 | 5/2006 | Manley et al. | |
| 2006/0168451 A1 | 7/2006 | Ishibashi et al. | |
| 2006/0277187 A1 | 12/2006 | Roese et al. | |
| 2007/0130232 A1 | 6/2007 | Therrien et al. | |
| 2007/0233827 A1 | 10/2007 | McKnight | |
| 2008/0155094 A1 | 6/2008 | Roese et al. | |
| 2008/0253283 A1 | 10/2008 | Douglis et al. | |
| 2008/0256140 A1 | 10/2008 | Lazzaro et al. | |
| 2009/0077140 A1 | 3/2009 | Anglin et al. | |
| 2009/0168440 A1 | 7/2009 | Croft | |
| 2009/0249005 A1 | 10/2009 | Bender et al. | |
| 2009/0271412 A1* | 10/2009 | Lacapra | G06F 17/30206 707/E17.032 |
| 2009/0271586 A1* | 10/2009 | Shaath | G06F 12/1466 711/163 |
| 2009/0282203 A1 | 11/2009 | Haustein et al. | |
| 2009/0287735 A1 | 11/2009 | Liedes et al. | |
| 2010/0191774 A1 | 7/2010 | Mason, Jr. et al. | |
| 2010/0274765 A1* | 10/2010 | Murphy | G06F 11/1451 707/652 |
| 2010/0306178 A1 | 12/2010 | Anglin et al. | |
| 2010/0306283 A1* | 12/2010 | Johnson | G06F 17/30085 707/803 |
| 2010/0312751 A1 | 12/2010 | Anglin et al. | |
| 2010/0325093 A1* | 12/2010 | Bates | G06F 17/30156 707/692 |
| 2010/0332454 A1 | 12/2010 | Prahlad et al. | |
| 2011/0161299 A1 | 6/2011 | Prahlad et al. | |
| 2011/0252073 A1* | 10/2011 | Pauly | G06F 17/30091 707/812 |
| 2011/0264635 A1 | 10/2011 | Yang | |
| 2011/0314148 A1* | 12/2011 | Petersen | G06F 11/3476 709/224 |
| 2012/0259821 A1 | 10/2012 | Alam | |
| 2013/0066931 A1 | 3/2013 | Lacapra et al. | |
| 2014/0074789 A1 | 3/2014 | Dutch et al. | |
| 2014/0172800 A1 | 6/2014 | Clark | |
| 2014/0189270 A1 | 7/2014 | Iwanicki et al. | |

OTHER PUBLICATIONS

Randal Burns andInderpal Narang—"Version Management and Recoverability for Large Object Data"—Multi-Media Database Management . . . , 1998—ieeexplore.ieee.org—pp. 1-8.*

Sun et al., "Data Backup and Recovery Based on Data De-Duplication," 2010 International Conference on Artificial Intelligence and Computational Intelligence (AICI), vol. 2, 23-24, pp. 379-382, Oct. 2010.

Wright et al., "Extending ACID semantics to the file system," Journal ACM Transactions on Storage (TOS) TOS Homepagearchive, vol. 3, Issue 2, Article No. 4. pp. 1-42, Jun. 2007.

Shaw et al., "Introduction," Pro Oracle Database 11g RAC on Linux—Installation, Administration, and Performance, pp. 1-25, Copyright 2010.

Sumathi, "Objected-Oriented and Object Relational DBMS," Studies in Computational Intelligence (SCI), Fundamentals of Relational Database, Springer-Verlag Berlin Heidelberg 2007, pp. 477-558.

* cited by examiner

METHOD AND SYSTEM FOR BACKUP AND RECOVERY

CROSS-REFERENCE TO RELATED APPLICATIONS

This Application is a Continuation of U.S. patent application Ser. No. 14/589,126, now U.S. Pat. No. 9,311,193, filed on Jan. 5, 2015, which is a Continuation of U.S. patent application Ser. No. 13/718,542, now U.S. Pat. No. 8,996,566, filed on Dec. 18, 2012, which claims priority to European Patent Application No. EPO12150010.2, filed Jan. 2, 2012, each of which are hereby incorporated by reference in their entirety.

FIELD OF THE INVENTION

The present invention relates in general to the field of data backup and recovery, and in particular to a method and a system for backup and recovery. Still more particularly, the present invention relates to a data processing program and a computer program product for backup and recovery.

DESCRIPTION OF THE RELATED ART

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data. Moreover, the computer system may include a complex data processing system or computing environment. A data processing system often requires computational resources or availability requirements that cannot be achieved by a single computer.

SUMMARY OF THE DESCRIBED EMBODIMENTS

The technical problem underlying the present invention is to provide a method and a system for backup and recovery, which are able to scale and simplify backup and recovery while avoiding shortcomings and pain points of prior art backup and recovery. For data backup and recovery based on linked file repositories with each of the linked file repositories representing an individual file system capable of storing at least one version of a file and being connected to at least one server system, each of the linked file repositories are placed in a certain position for storing a certain version of the file. Each position of each of the linked file repositories is continuously numbered. A number of the versions of the file are determined by the position of the one of the linked file repositories.

According to the present invention this problem is solved by providing a method for backup and recovery having the features of claim 1, a system for backup and recovery having the features of claim 12, a data processing program for backup and recovery having the features of claim 14, and a computer program product for backup and recovery having the features of claim 15. Advantageous embodiments of the present invention are mentioned in the subclaims.

Accordingly, in an embodiment of the present invention a method for backup and recovery is based on linked file repositories, each representing an own file system capable of storing one version of a file and being connected to a least one server system; wherein each file repository is placed in a certain position storing a certain version of the file; wherein positions of the file repositories are continuously numbered; wherein a number of the certain version of the file is determined by the position of the corresponding file repository; wherein a version-movement process over all file repositories is implemented to perform a file write operation; and wherein a version-recovery process over all file repositories is implemented to perform a file-read operation of a certain file version.

In further embodiments of the present invention, positions of the file repositories are continuously numbered beginning at "1"; wherein a first file repository is numbered "1" storing a first version of the file representing a most recent version of the file.

In further embodiments of the present invention, the version-movement process is implemented with following steps: Receiving a file write operation with a new version of a file to be written from at least one server system or a preceding file repository; determining if a version of the file to be written already exists in a corresponding file repository; if a version of the file to be written already exists in the file repository, verify versioning policies; move the existing file version from the repository to a subsequent file repository, if the versioning policies indicate a higher number of versions to be saved than a position number of the file repository; otherwise delete the existing file version in the file repository; store the new version of the file to be written from at least one server system or a preceding file repository in the file repository; if no version of the file to be written exists in the file repository, store the new version of the file to be written in the file repository.

In further embodiments of the present invention, the version-recovery process is implemented with following steps: Receiving a file-read operation including a version number of a file to be read from the at least one server system; examining the version number of said file to be read; determining if the requested version of the file to be read exists in a file repository whose position number matches the received version number; if the requested version of the file to be read exists, read and send the file to a requesting server system; otherwise indicate a file read-error to the requesting server system if the requested version of the file does not exist.

In further embodiments of the present invention, the version-movement process is implemented on a block-differential basis with the following steps: Receiving a file write operation with a new version of a file to be written from the at least one server system or a preceding file repository; determining if a version of the file to be written already exists in a corresponding file repository; if a version of the file to be written already exists in the file repository verify versioning policies; compare data content of the new version of the file to be written and an existing version of the file to be written; and determine different data blocks; move the different data blocks from the existing version of the file to be written from the file repository to a subsequent file repository, if the versioning policies indicate more versions than a position number of the file repository; otherwise delete the different data blocks of the existing file version in the file repository; store the different data blocks of the new version of the file to be written from the at least one server system or a preceding file repository in the file repository; if no version of the file to be written exists in the file repository, store the new version of the file to be written in the file repository.

In further embodiments of the present invention, the version-recovery process is implemented on a block-differential basis with the following steps: Receiving a file-read operation including a version number of a file to be read from the at least one server system; examining the version number of the file to be read; determining if the requested version of the file to be read exists in a file repository whose position number matches with the requested version number; if the requested version of the file to be read exists, recreate the requested version of the file to be read by determining if the requested version of the file to be read is the most recent version of the file to be read; if the requested version of the file to be read is the most recent version of the file to be read, read and send the most recent version of the file from the first file repository to the requesting server system; otherwise read content of each file repository whose position number is less or equal to the requested version number of the file to be read; replace the different data blocks of a more recent version of the file to be read with the different data blocks of an older version of the file to be read; and send the recreated version of the file to be read to the requesting server system; if the requested version of the file does not exist, indicate a file read-error to the requesting server system.

In further embodiments of the present invention, the requested version number is part of the read-command including file name and the version number, or is set as file attribute prior to sending the read-command.

In further embodiments of the present invention, the requested version number is an integer number, or a date range, or a time range.

In further embodiments of the present invention, each file repository includes at least one of the following functions: A deduplication function allowing to deduplicate files based on their version number, indexing functions allowing to index the files and providing search and discovery capabilities, and an expiration function for moved files determining when a moved file expires and is being deleted time-based or event-based.

In further embodiments of the present invention, at least one function is performed for all files stored in the file repository.

In further embodiments of the present invention, at least one function is performed for all files stored in the file repository matching at least one of the following rules: File extension matches a certain pattern; file name matches a certain pattern; file path name matches a certain pattern; file owner matches a certain pattern; and file creation, modification or last access time matches a certain date/time range.

In another embodiment of the present invention, a system for backup and recovery in communication with at least one server system comprises a number of file repositories physically connected to each other; wherein each file repository represents an own file system capable of storing one version of a file and comprises at least one file system interface and at least one file storage; wherein each file repository is placed in a certain position storing a certain version of the file; wherein positions of the file repositories are continuously numbered; wherein a number of the certain version of the file is determined by the position of the corresponding file repository; and a control module logically connected to each file repository and the interfaces, wherein the control module implements a version-movement process over all file repositories to perform a file write operation; and implements a version-recovery process over all file repositories to perform a file-read operation.

In further embodiments of the present invention, the file repository is implemented as local file system, or as linear tape file system, or as remote file system. So, the file repository could be implemented as any kind of state of the art local file systems including but not limited to zFS, sect3 and ext4, Balanced Tree file system (BTRFS), General Parallel File System (GPFS), New Technology File System (NFTS), Apple File System (AFS) or as linear tape file system (LTFS). Furthermore, the file repository could be provided as remote file system such as network attached storage (NAS) system implementing Network File System protocol (NFS) and Common Internet File System protocol (CIFS).

In another embodiment of the present invention, a data processing program for execution in a data processing system comprises software code portions for performing a method for backup and recovery when the program is run on the data processing system.

In yet another embodiment of the present invention, a computer program product stored on a computer-usable medium, comprises computer-readable program means for causing a computer to perform a method for backup and recovery when the program is run on the computer.

All in all, this invention teaches a backup storage file system which enables scalable and simplified backup and recovery solutions by using multiple file systems which are logically connected. Each file system—also called file repository—stores one version of a file. This fosters scalability because not all versions are stored in the same file system. The backup storage file system provides a file system interface. This fosters simplification for the backup and recovery process because this does not require a backup client and server. In opposite to prior art operating system commands are used. In addition the data can be viewed and accessed easily via a file system interface because the data-format (file) is preserved.

The backup storage file system supports enhanced functions such as versioning, deduplication, replication and indexing which are all aware of the version of the file. For example this allows to index the first (latest) version of a file, which is typically needed for queries and recoveries; and to deduplicate the second version of a file which is typically not required for queries and recoveries.

The backup storage file system can store data on any storage technology which supports file systems including but not limited to hard disk, solid state disk (SSD), optical disk such as DVD or Blu-Ray, and tape, the latter leveraging the linear tape file system.

Embodiments of the present invention implement a backup storage file system physically connected via a network to one or more server systems, which require the backup of files. In an alternated embodiment the backup storage file system is comprised in a server system.

The backup storage file system includes one or more file repositories each comprising at least one file system interface and at least one file storage. Said file repositories are physically connected, for example via a network, to each other; each representing an own file system capable of storing one version of a file. Each file repository is placed in a certain position which is continuously numbered beginning at "1". The file repository with number "1", i.e. the first file repository, exposes its file storage capacity via its file system interface to the servers connected to the backup storage file system. In the first file repository the first version of the data is stored which in this semantic is the youngest version.

The backup storage file system includes a control module, which is logically connected to each file repository and the interfaces. The control module implements a version-movement process over all file repositories. This version-movement process assures that each file repository stores a version of each file. The number of the version is determined by the position of the file repository. For example the first file repository stores the first (latest version); the second file repository stores the second (pre-latest version) and so on.

In one embodiment the movement process will only move the parts of the file data that have changed between the existing file (to be moved) and the new file that is being written.

The same version-movement method is implemented for the subsequent file repositories with the difference that the subsequent file repositories do not receive direct file write operations from the servers but from the control module. For example if the existing file in the first file repository is moved to the second file repository the control module checks if a file with the same path and file name already exists in the second repository. If this is the case then it checks the versioning policies and if the versioning policies indicate more than two versions then the existing version of the file is moved to the third repository before said new file is placed in the second repository. Otherwise if the versioning policies indicate two versions or less then the new file replaces the existing file in the second file repository.

Any file repository can include a deduplication function allowing deduplicating files based on their version number. Any file repository can include indexing functions allowing to index the files and provide search and discovery capabilities. Each file repository beyond the first one can include an expiration policy that is assigned to each file being stored in the file repository. The expiration policy determines when a file expires and is being deleted. The expiration policy can be time-based (e.g. 30 days) or event-based (e.g. 30 days after the file has been deleted). Any file repository can be a file system on disk, SSD or on tape, the latter leveraging the linear tape file system.

The control module included in the backup storage file system implements a version-recovery process over all file repositories. The version number of the file to be recovered can be given by different means. It can be given as part of the read-command, which requires changing the read-command. It can also be given in a file attribute, which can easily be set prior to sending the read command. It can also be given by other means of communication. The Version number, which is included in the file-read operation, can be an integer number. It can also be a date and time range.

The above, as well as additional purposes, features, and advantages of the present invention will become apparent in the following detailed written description.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

Figure 1:
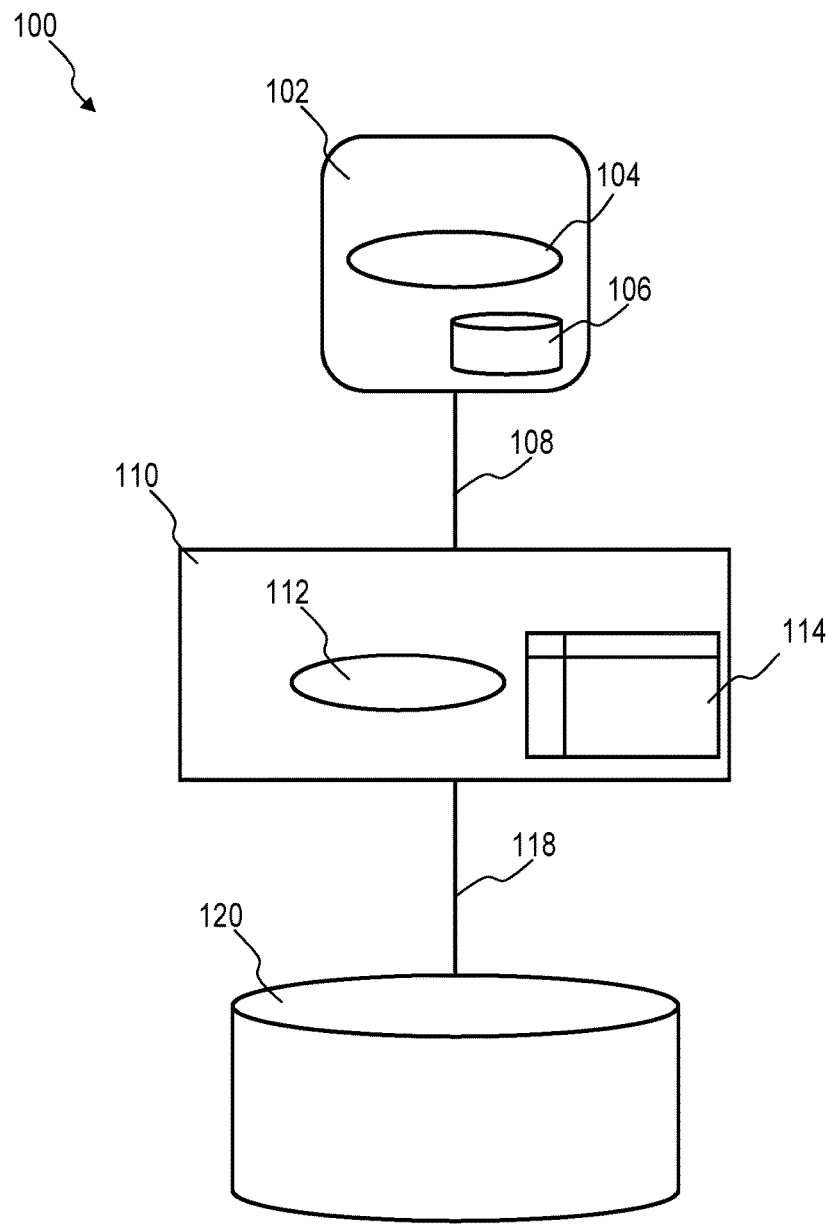
FIG. 1 is a schematic block diagram of a Prior Art backup and recovery system architecture.

The detailed description explains the preferred embodiments of the invention, together with advantages and features, by way of example with reference to the drawings. In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF CERTAIN EMBODIMENTS

Referring to FIG. 1, a typical backup and recovery system 100 includes a backup client 104 running on a server 102, which includes one or more primary file systems 106, primary in a sense that the original copy of the data is stored here. The backup client 104 identifies and copies the files from the primary file systems 106 to the backup server system 110 via a backup network 108. The backup server includes backup server software 112, which extracts the metadata such as retention times, policies and storage location for the files and stores the files in an attached backup storage system 120 via a storage network 118. The metadata is stored in a separate metadata database 114 maintained by in the backup server software.

For recovery the backup client 104 sends a recovery-request for a certain file or sets of files to the server system 110. The server system software 112 checks the metadata database 114 to find the storage location of the file and retrieves said files from the backup storage 120 and sends it to the clients system which places it on the primary storage. The recovery-request sent by the client system may include the version of the file to be recovered.

While backup and recovery systems offer a variety of value adding functions such as versioning, indexing, high availability, replication and deduplication their implementation and operation is rather complex. The complexity comes from the client-server architecture. It may include multiple specialized server systems 110 such as media servers and data servers. In addition the format of the data, which is being backed up, is not preserved in the backup server system 110 and storage 120. This means the backup server software 112 stores the data in a proprietary format and maintains metadata describing the data. The metadata is stored in the metadata database 114. Thus without the backup server software 112, and in particular the metadata database 114, no recovery is possible. Prior art backup and recovery systems are flexible in regards to the storage technology, which in fact makes the administration and maintenance more complex. Prior art backup and recovery systems integrate with different kinds of applications and systems on the client site (102) such as file systems, databases, ERP systems, and mail servers. This provides flexibility, but at the same time makes it more complex for an administrator to configure backup and recovery procedures.

According to international IT consultants in 2011, the majority of the data today is stored in file systemshttp://searchunifiedcommunications.bitpipe.com/detail/RES/1273020851_887.html_blank. In addition any operating system includes commands to copy files from one file system to another file system, which enables simplified backup and recovery solutions. However, the ever growing amount of data files combined with multiple versions thereof drives single file systems to its limits. The limits are set for example by the number of inodes which a single file system can manage. The limits are also set by housekeeping operations such as defragmentation, which may not be possible when a certain maximum amount of files is exceeded in a file system. For example, one GPFS (General Parallel File System) file system within an IBM SoNAS system can store 1 billion files.

In the Patent Application Publication US 2010/0191774 A1 "METHOD AND SYSTEM FOR VERSIONED FILE SYSTEM USING STRUCTURED DATA REPRESENTATIONS" by Mason, J R. et al., a versioned file system is disclosed. In a disclosed embodiment, at a first time, an interface creates and exports to a data store a first structured data representation corresponding to a first version of the local file system. The first structured data representation is an XML (eXtensible Markup Language) tree having a root element, one or more file elements associated with the root element and one or more file elements associated with a given directory element. Upon a change within the file system, e.g., file creation, file deletion and directory modification, the interface creates and exports a second structured data representation corresponding to a second version of the file system. The second structured data representation differs from the first structured data representation up to and including the root element of the second structured data representation. So the disclosed versioned file system is based on different structured representations associated with different versions of a file. Each different structured representation is exported as different file system to the user, so each version of a file is a different file system within the versioned file system. However, this patent application does not disclose the concept of physically storing different versions of a file in different file systems and automatically migrating old versions to a next file system when a newer version is backed up.

In the Patent Application Publication US 2009/0077140 A1 "DATA RECOVERY IN A HIERARCHICAL DATA STORAGE SYSTEM" by Anglin et al. systems and methods for retrieving data are disclosed. The disclosed systems and methods comprise a plurality of storage pools. The disclosed method comprises processing configurable data retrieval instructions to determine a first storage pool from which target backup data is to be retrieved, in response to a data restore request; and retrieving the target backup data from the first storage pool to satisfy the restore request. So, systems and methods for physically storing different versions of a file in different data pools and likewise methods for retrieving different versions from the respective data pool are disclosed. However, storing different versions of files in physically linked file systems is not disclosed. File systems are the origin of files and backing up files into a file system makes recovery procedures easier, whereas pools as abstract entities require additional efforts to extract files for recovery.

Figure 2:
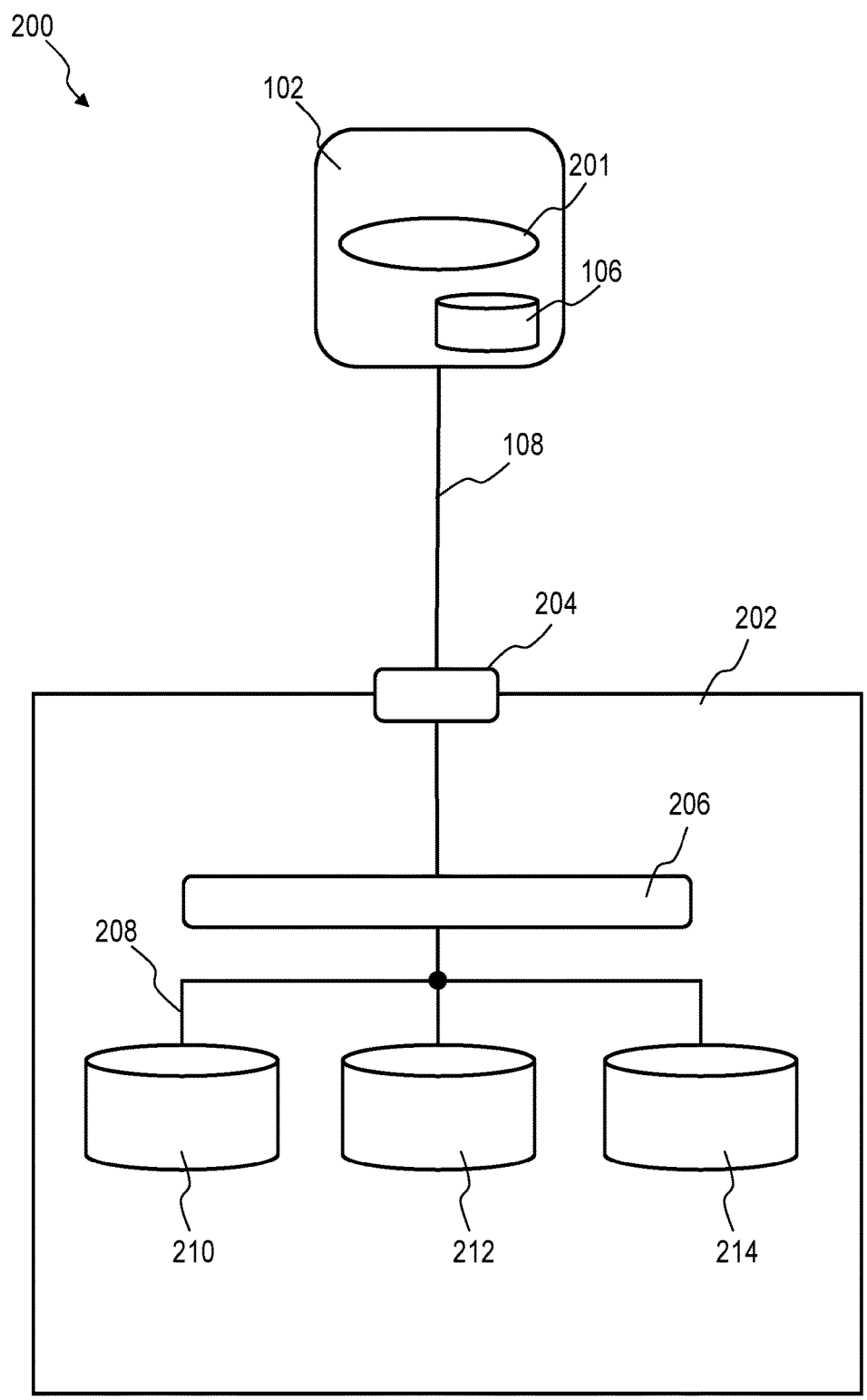
FIG. 2 is a schematic block diagram of a backup and recovery system architecture, in accordance with an embodiment of the present invention.

FIG. 2 shows a novel backup and recovery architecture 200 which is based on the novel backup storage file system 202, according to an embodiment of the present invention. The backup storage file system 202 is physically connected via a backup network 108 to one or more server systems 102. It thereby presents a file system interface 204 to the server systems 102 which can be a remote file system—also known as Network Attach Storage (NAS) such as NFS (Network File System) or CIFS (Common Internet File System).

The backup storage file system 202 includes one or more file repositories 210, 212, 214, each comprising at least one file system interface and at least one file storage. The file repositories 210, 212, 214 are physical connected via a network 208 to each other. In an alternate embodiment these file repositories are locally mounted in a server system which is representing the backup storage file system 202. Each file repository 210, 212, 214 is configured to store one version of each file, for example as file repository 210 stores the first (latest) version, file repository 212 stores the second (pre-latest) version and file repository 214 stores the third last version. People skilled in the art may recognize that the number of file versions scales with the number of file system repositories 210, 212, 214 to a virtual unlimited number of versions.

The backup storage file system 202 also includes a controller 206 which provides version-movement and version-recovery functions. The version-movement function assures that each version of a file is stored on a separate file repository 210, 212, 214. The version-recovery function allows recovering any existing version of a file. In an alternate embodiment the novel backup storage file system is included in server systems 102. Each file repository 210, 212, 214 can be configured to perform value adding functions according to techniques such as versioning, deduplication, replication, indexing and search, expiration policies and the like. These functions can be configured for all files stored in a file repository 210, 212, 214 or they can be configured for files matching certain rules, such as: File extension matches a certain pattern; file name matches a certain pattern; file path name matches a certain pattern; file owner matches a certain pattern; file creation, modification or last access time matches a certain date/time range. The invention is not limited to these rules.

The server systems 102 include operating systems 201 which provide copy-commands. The backup storage file system 202 presents a file system interface 204 to the server systems 102. The copy commands of the operating system 201 of the server system 102 can be used to backup or recover files from the primary file system 106 of the servers and the backup storage file system 202. The controller 206 intercepts the copy commands in any direction and provides version-movement (on write) and version-recovery (on read) functions.

Figure 3:
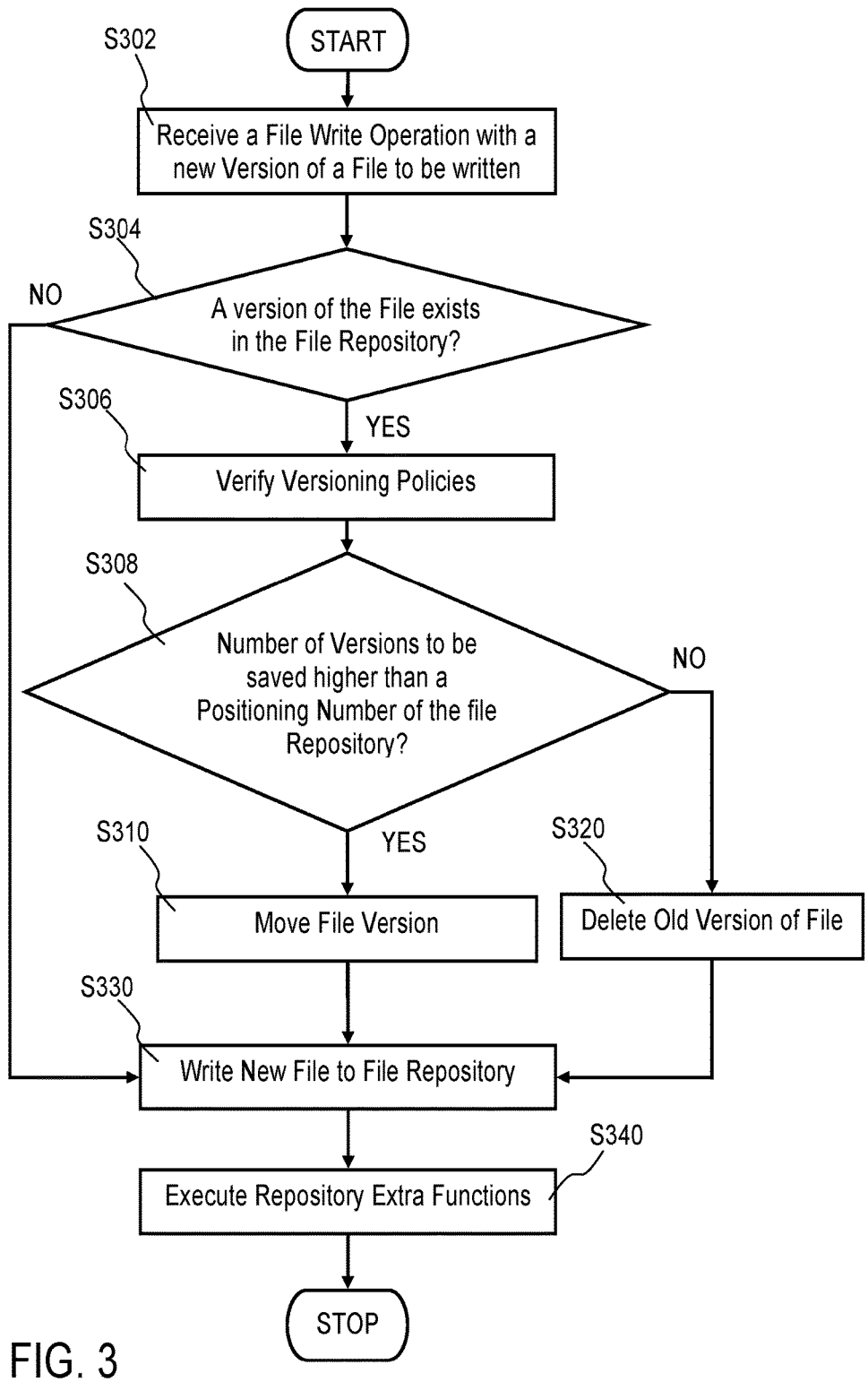
FIG. 3 is a schematic flow diagram of a version-movement process being part of a backup and recovery method, in accordance with a first embodiment of the present invention.

FIG. 3 shows a version-movement process being part of a backup and recovery method, in accordance with a first embodiment of the present invention. The first embodiment of the version-movement process is being described with reference to FIGS. 2 and 3. In step S302, a file write operation with a new version of a file to be written is received from the at least one server system 102 or a preceding file repository 210, 212. In step S304, it is determined if a version of the file to be written already exists in a corresponding file repository 210, 212, 214. If a version of the file to be written already exists in the file repository 210, 212, 214 versioning policies are verified in step S306. Versioning policies are configured by the administrator of the backup storage file system 202 and are policies. In step S308, it is determined if the versioning policies indicate a higher number of versions to be saved than a position number of the corresponding file repository 210, 212, 214. If the versioning policies indicate a higher number of versions to be saved than a position number of the file repository 210, 212, 214, the existing file version from the repository 210, 212 is moved to a subsequent file repository 212, 214 in step S310; otherwise the existing file version in the file repository 210, 212, 214 is deleted in step S320. In step S330 the new version of the file to be written from at least one server system 102 or a preceding file repository 210, 212 is written to the file repository 210, 212, 214. If no version of the file to be written exists in the corresponding file repository 210, 212, 214, the new version of the file to be written is written to the corresponding file repository 210, 212, 214 in step S330. For example, if the number of versions to be saved is two and two versions of the file to be written already exist in the file repositories 210, 212, the existing version of the file to be written in the second file repository 212 is deleted and the existing version of the file to be written in the first file repository 210 is moved to the second file repository 212, and the new version of the file to be written from the file system 102 is written in the first file repository 210.

The process including steps S302 to S340 is performed for every file repository 210, 212, 214 of the backup storage file system 202. In other words, for the first repository 210 the controller 206 receives a file write operation via interface 204 from a server system 102, in step S302. In the next step S304, the controller 206 determines if a version of the file to be written already exists in the first file repository 210. If the file does not exist in the first file repository 210, the process flows to step S330 where the file is being written to the first file repository 210. If the file does exist in the first file repository 210, versioning rules for the file are verified in step S306. Therefore controller 206 queries the first file repository 210. If only one version of the file is to be kept, the process flows to step S320 where the old file is being deleted in the first file repository 210. Afterwards the process flows to step S330 where the file is being written to the first file repository 210.

If the query of the first file repository 210 indicates that more than one version is to be kept, the controller 206 moves the existing version of the first file repository 210 in step S310 to the second file repository 212. Now the version-movement process is performed for the second file repository 212. The second file repository 212 receives a new version of the file to be written from the first file repository 210 in step S302. In the next step S304, the controller 206 determines if a version of the file to be written already exists in the second file repository 212. If the file does not exist in the second file repository 212, the process flows to step S330 where the file is being written to the second file repository 212. If the file does exist in the second file repository 212 versioning rules for the file are verified in step S306. Therefore controller 206 queries the second file repository 212. If only two versions of the file are to be kept, the process flows to step S320 where the old file is being deleted in the second file repository 212. Afterwards the process flows to step S330 where the file is written to the second file repository 212. If more than two versions of the file are to be kept, the process flows to step S310 where the old file is being moved to the third file repository 214 in step S310. Afterwards the process flows to step S330 where the new file is written to the second file repository 212. Then the process according to step S302 to S340 is repeated for the third file repository 214 of the backup storage file system 202.

The third file repository 214 receives a new version of the file to be written from the second file repository 212 in step S302. In the next step S304, the controller 206 determines if a version of the file to be written already exists in the third file repository 214. If the file does not exist in the third file repository 214, the process flows to step S330 where the file is being written to the third file repository 214. If the file does exist in the third file repository 214 versioning rules for the file are verified in step S306. Therefore controller 206 queries the third file repository 212. Since only three file repositories 210, 212, 214 are present in the shown embodiment, only three versions of the file can be kept in the system 202, and the process flows to step S320, where the old file is being deleted in the third file repository 214. Afterwards the process flows to step S330 where the file is written to the third file repository 212.

Once the file movement operations are done and the file has been written to the first file repository 210, the controller 206 or the file repositories 210, 212, 214 check and initiate additional functionality like deduplication or indexing in the file repositories 210, 212 and 214 in step S340, which ends the active file write process.

The version-movement process essentially assures that if a new version of a file is written to the backup storage file system 202, the previous versions are moved to the subsequent file repositories 212 and 214. This assures that the different versions are stored in separated file systems allowing scalability and the execution of value-adding functions.

In a further embodiment, a differential version-movement process might be incorporated to lower the amount of data that needs to be transferred while effectively saving storage space, this is explained with reference to FIG. 5.

Figure 4:
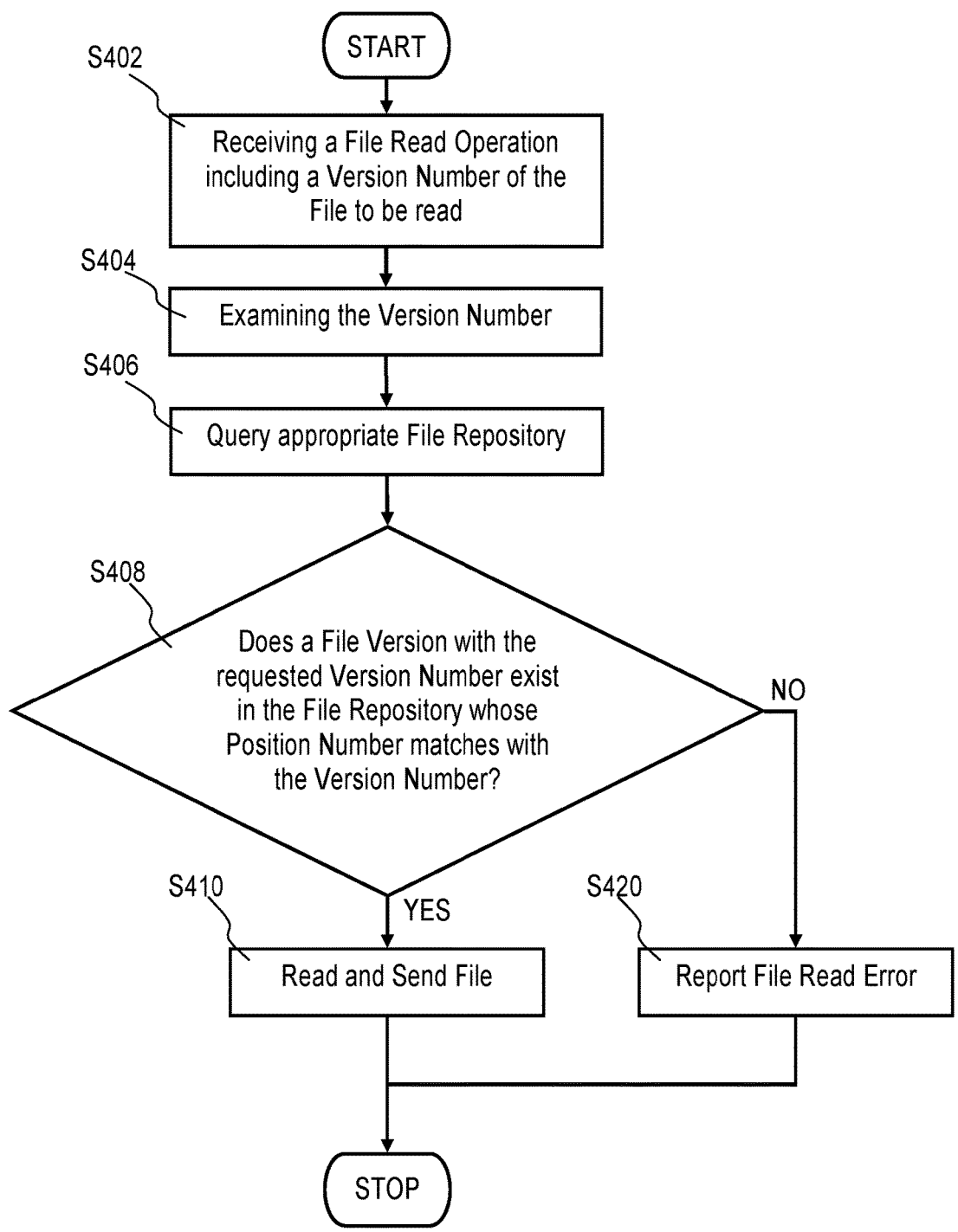
FIG. 4 is a schematic flow diagram of a version-recovery process being part of the backup and recovery method, in accordance with the first embodiment of the present invention.

FIG. 4 shows a version-recovery process being part of the backup and recovery method, in accordance with the first embodiment of the present invention. Referring to FIG. 4, the version-recovery process is executed when a read command sent by a server system 102 for a file is received by the backup storage file system 202. The read command might be adjusted to include the version of the file that is to be read. If the read command does not include a version number, the latest and most actual version is referenced.

In an alternate embodiment a file attribute can be used to denote the version of the file to be retrieved, instead of modifying the read command. In this case the file attribute is checked by the backup storage file system 202 when the read-command is received and the proper version is retrieved from the proper file repository according to the version-recovery process. The version-recovery process is being described with reference to FIGS. 2 and 4. In step 402, controller 206 receives a file read command via interface 204 from a server system 102. The file read command might be adjusted to include the version of the file that is to be read.

In the next step S404, controller 206 checks which version number of the file is to be read. If no version number is being given, the default value will be used which is the first file version, meaning the latest saved one in the first file repository 210. In an alternate embodiment a file attribute can be used to denote the version of the file to be retrieved instead of modifying the read command. In this case the file attribute previously set by the server 102 is checked in step S404 and the version is determined. After determining the file version number that is to be restored, controller 206 will query the file repository 210, 212, 214, which should have this file version, in step S406. If the requested file version does not exist within that file repository 210, 212, 214, the controller 206 moves from step S408 to step S420 and reports a file read error to the server system 102. If the requested file exists, then the controller 206 moves from step S408 to step S410 and reads the file version from the determined file repository 210, 212, 214 and send the read file version to the requesting server system 102 via the interface 204 and the network 108.

The version-recovery process allows recovering an existing version of a file. The workload associated with the recovery process is only present for that part of the file repository 210, 212, 214 which has the requested version of the file(s).

Figure 5:
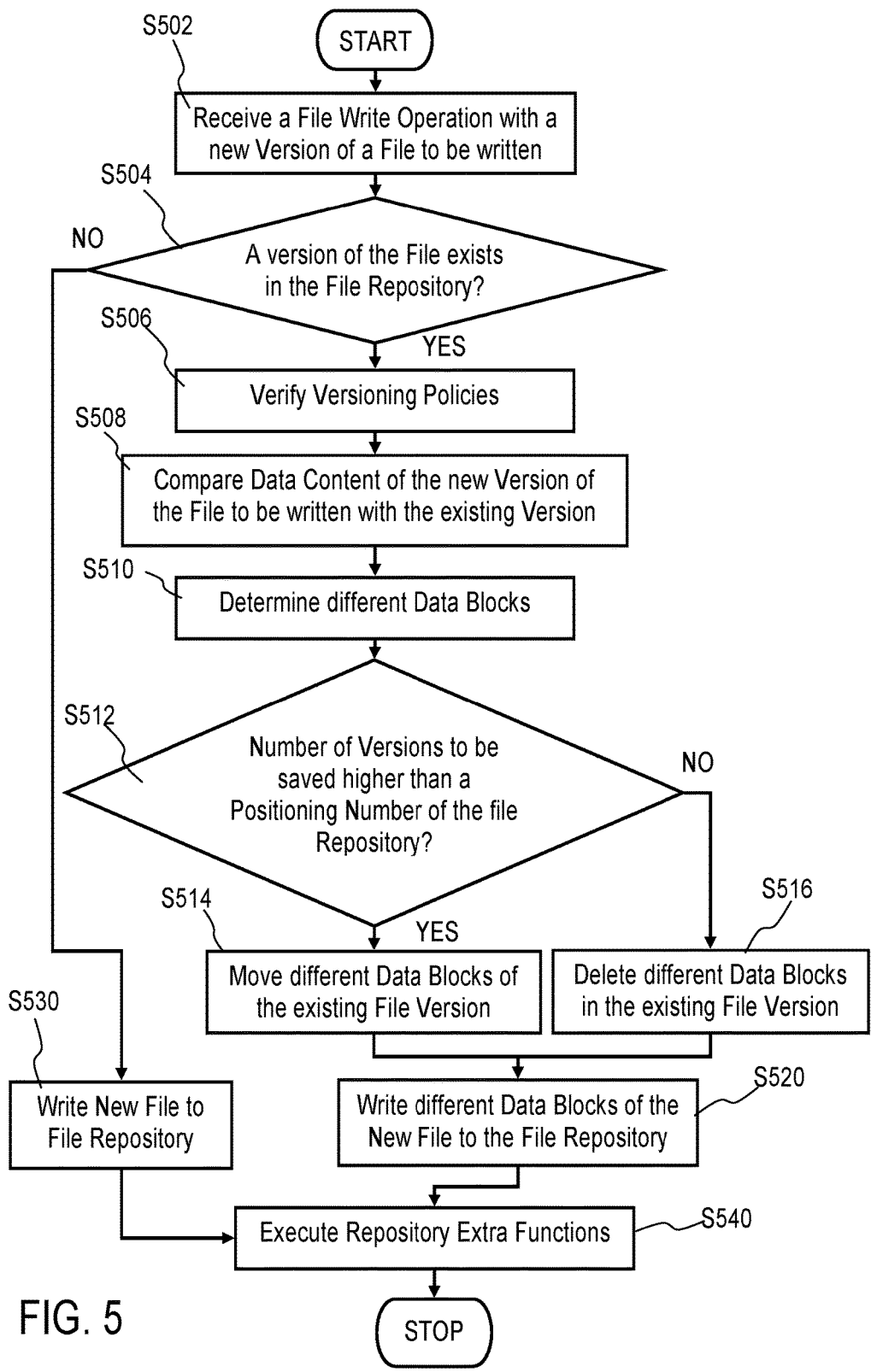
FIG. 5 is a schematic flow diagram of a version-movement process being part of a backup and recovery method, in accordance with a second embodiment of the present invention.
Figure 6:
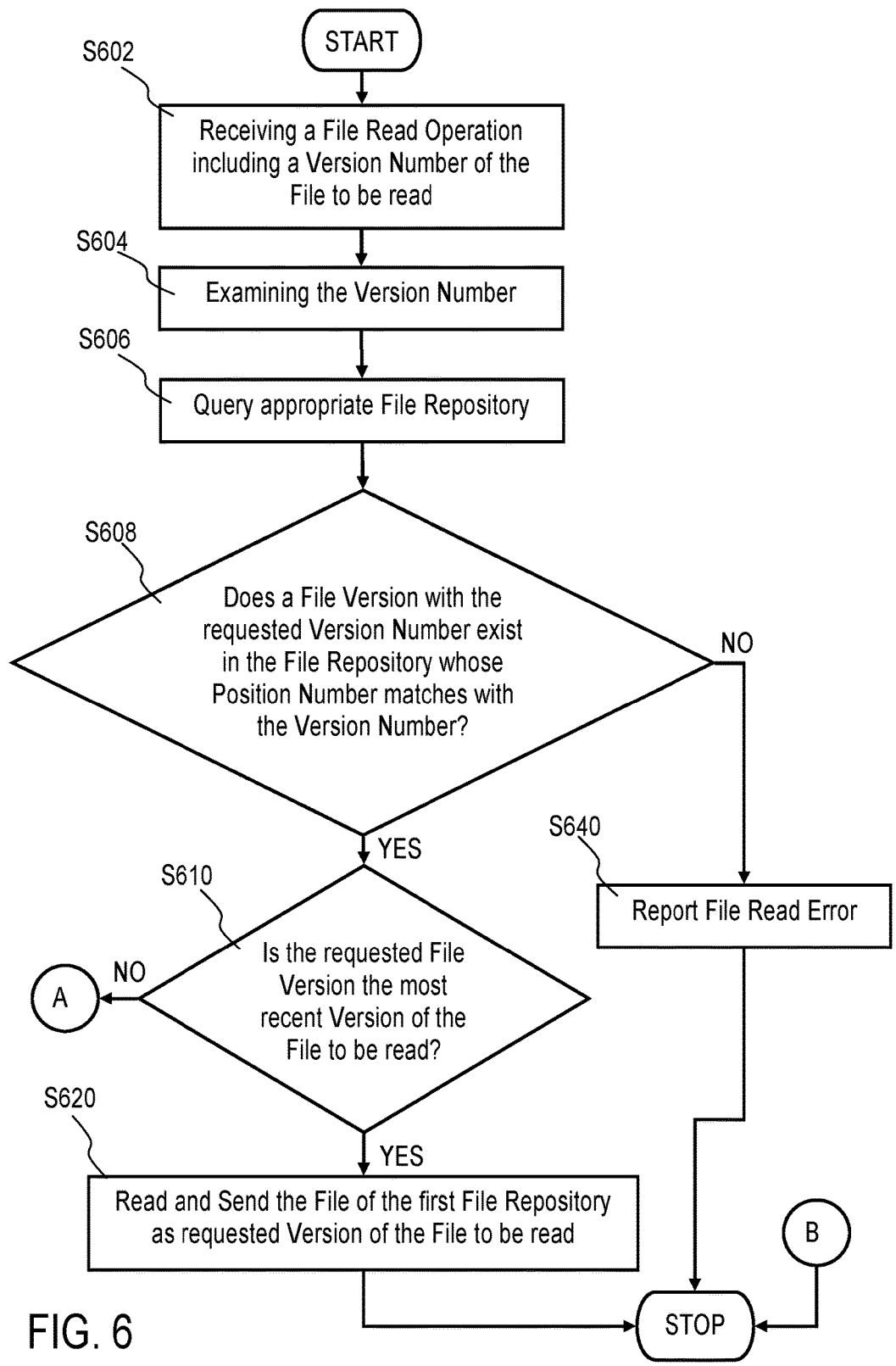
FIGS. 6 and 7 is a schematic flow diagram of a version-recovery process being part of the backup and recovery method, in accordance with the second embodiment of the present invention.
Figure 7:
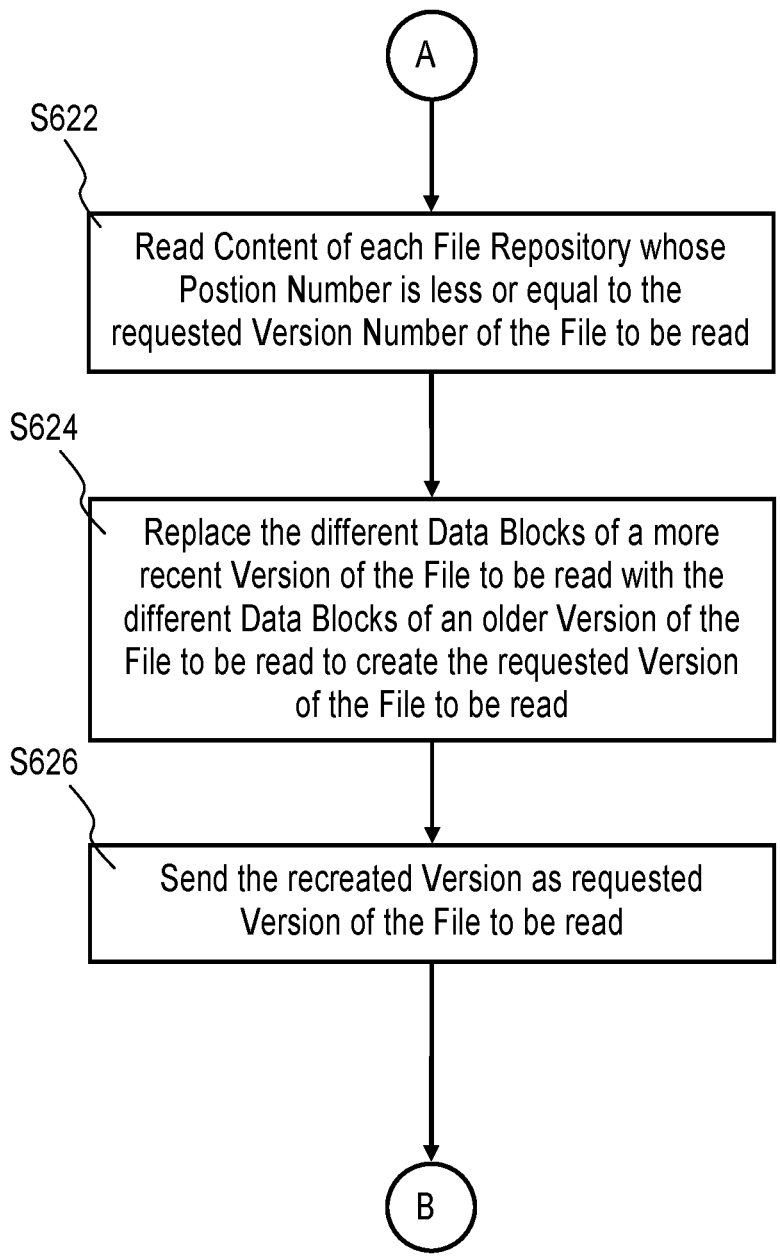

FIG. 5 shows a differential version-movement process being part of a backup and recovery method, in accordance with a second embodiment of the present invention; and FIGS. 6 and 7 show a differential version-recovery process being part of the backup and recovery method, in accordance with the second embodiment of the present invention. The differential version-movement process is being described with special reference to FIGS. 5, 6 and 7.

As typically files are not completely changed between versions but mostly only slightly modified it makes sense to store only the differences for the different versions and point to the original data. Therefore controller 206 shall incorporate a differential analysis algorithm to discover changes between files. Said algorithm might use binary differences or content-orientated methods, i.e. text files checking, etc.

In step S502, a file write operation with a new version of a file to be written is received from the at least one server system 102 or a preceding file repository 210, 212. In step S504, it is determined if a version of the file to be written already exists in a corresponding file repository 210, 212, 214. If a version of the file to be written already exists in the file repository 210, 212, 214 versioning policies are verified in step S506. In step S508, data content of the new version of the file to be written is compared with the existing version of the file to be written. Then differing data blocks are determined in step S510. In step S512, it is determined, if the versioning policies indicate a higher number of versions to be saved than a position number of the corresponding file repository 210, 212, 214. If the versioning policies indicate a higher number of versions to be saved than a position number of the file repository 210, 212, 214 the differing data blocks in the existing file version from the repository 210, 212 are moved to a subsequent file repository 212, 214 in step S514; otherwise the differing data blocks in the existing file version in the file repository 210, 212, 214 are deleted in step S516. In step S520 the differing data blocks of the new version of the file to be written from the at least one server system 102 or a preceding file repository 210, 212 are written in the file repository 210, 212, 214. If no version of the file to be written exists in the corresponding file repository 210, 212, 214, the new version of the file to be written is written in the corresponding file repository 210, 212, 214 in step S530.

Once the file movement operations are done and the file has been written to the first file repository 210, the controller 206 checks and initiated additional functionality like deduplication or indexing in the file repositories 210, 212 and 214 in step S540, which ends the active file write process. The process according to step S502 to S540 is performed for every file repository 210, 212, 214 of the backup storage file system 202.

In other words the controller 206 will calculate the difference between the new version of the file to be written and all previous versions. Upon that only the differences between the new file version and the older versions will be moved. The difference relates to data blocks or fixed or variable files that are composing the file. Obviously the copy will have a pointer to the original file to put the file back together. Thus at the end of this process different segments of a file are stored in different file repositories 210, 212, 214 and it is tracked which data blocks in which repository match which version of the file.

Referring to FIGS. 6 and 7, in step S602, controller 206 receives a file read command via interface 204 from a server system 102. The file read command might be adjusted to include the version of the file that is to be read. In the next step S604, controller 206 checks which version number of the file is to be read. If no version number is being given, the default value will be used which is the first file version, meaning the latest saved one in the first file repository 210. In an alternate embodiment a file attribute can be used to denote the version of the file to be retrieved, instead of modifying the read command. In this case the file attributes previously set by the server 102 is checked in step S604 and the version is determined. After determining the file version number that is to be restored, controller 206 will query the file repository 210, 212, 214, which should have this file version, in step S606. If the requested file version does not exist within that file repository 210, 212, 214, the controller 206 moves from step S608 to step S640 and reports a file read error to the server system 102. If the requested file exists, then the controller 206 moves from step S608 to step S610 and determines if the requested file version is the most recent version of the file to be read. If the most recent file version is requested, the file of the first file repository 210 is read and sent as requested version of the file to be read to the requesting server system 102 via the interface 204 and the network 108 in step S620.

If another file version than the most recent one is requested, the controller 206 moves to step S622 and reads content of each file repository 210, 212, 214, whose position number is less or equal to the requested version number of the file to be read. In step S624, the controller 206 replaces different data blocks of more recent versions of the file to be read with different data blocks from older versions of the file to be read to create the requested version of the file to be read. In step S626, the controller 206 sends the recreated version as requested version of the file to be read to the requesting server system 102 via the interface 204 and the network 108.

This will lower the amount of data being transferred and enhances read performance, because the most of the data will reside on the first file repository, which will typically be the most active because it stores the most recent version of each file.

One further enhancement of the differential version-movement process might be to make the algorithm even more intelligent to discover the most common version from which the differences should be calculated. For example, version "2" of a file might be more similar to all other file versions than version "1".

Embodiment of the present inventive can be entirely implemented as a software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), DVD, and BD (Blu-Ray Disk). A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, SCSI, iSCSI (Internet SCSI), Ethernet, and Fibre-Channel over Ethernet (FCoE) cards are just a few of the currently available types of network adapters.

What is claimed is:

1. A method for data backup and recovery by a processor based on linked file repositories with each of the linked file repositories representing an individual file system capable of storing at least one version of a file and being connected to at least one server system, wherein the method includes:
   placing each of the linked file repositories in one of a plurality of positions for storing the at least one version of the file;
   continuously numbering each of the plurality of positions of each of the linked file repositories;
   determining a number of the at least one version of the file by the one of a plurality of positions of the one of the linked file repositories;
   for each of the linked file repositories, performing at least one function operation for each file stored in the linked file repositories matching at least one rule, wherein the at least one function operation includes at least one of a deduplication function allowing deduplicating files based on the version number, an indexing function allowing to index the file and providing search and discovery capabilities, and an expiration function for moved files determining when a moved file expires and is being deleted time-based or event-based; wherein the at least one rule includes a file extension matching a certain pattern, a file name matching one of a plurality of patterns, a file path name matching the one of a plurality of patterns, a file owner matching the one of a plurality of patterns, a file creation, and a modification or last access time matching a specified date and a specified time range; and
   implementing the version-recovery process on a block-differential basis by performing one of:
   receiving a write operation with a new one of the at least one version of the file to be written from one of the at least one server system and a preceding one of the linked file repositories,
   determining if the new one of the at least one version of the file to be written exists in the one of the linked file repositories,
   if the new one of the at least one version of the file to be written exists in the one of the linked file repositories performing one of:
   comparing data of the new one of the at least one version of the file to be written and an existing one of the at least one version of the of the file to be written, determining different data blocks,
   moving the different data blocks from the existing one of the at least one version of the of the file to be written from the one of the linked file repositories to a subsequent one of the linked file repositories if versioning policies indicate a higher number of the at least one version as compared to a position number of the one of the linked file repositories, otherwise:
       deleting the different data blocks of the existing one of the at least one version in the one of the linked file repositories, and
   storing the different data blocks of the new one of the at least one version of the file to be written from one of the at least one server system and the preceding one of the linked file repositories, and
   if the at least one version of the file to be written does not exist in the one of the linked file repositories:
   storing the new one of the at least one version of the file to be written from the one of the linked file repositories;
   including the version number and a file name of the requested version of the file to be read as part of the read operation, wherein the requested version number is one of an integer number, a date range, and a time range; and
   setting the version number of the requested version as a file attribute prior to the read operation.

2. The method of claim 1, further including implementing a version-recovery process over each of the linked file repositories to perform a read operation of the at least one version of the file.

3. The method of claim 1, further including continuously numbering each of the plurality of positions of each of the linked file repositories beginning at a numerical value of 1, wherein a first one of the linked file repositories is numbered as 1, and a first version of the at least one version of the file representing a most recent version of the file is stored.

4. The method of claim 1, further including implementing the version-recovery process by performing one of:
   receiving a write operation and a new one of the at least one version of the file to be written from one of the at least one server system and a preceding one of the linked file repositories,
   determining if the new one of the at least one version of the file to be written exists in the one of the linked file repositories, if the new one of the at least one version of the file to be written exists in the one of the linked file repositories performing one of:
  verifying versioning policies,
  moving an existing one of the at least one version from the corresponding one of the linked file repositories to a subsequent one of the linked file repositories if the versioning policies indicate a higher number of the at least one version that are to be saved as compared to a position number of the one of the linked file repositories, otherwise:
    deleting the existing one of the at least one version in the one of the linked file repositories, and
  storing the new one of the at least one version of the file to be written from one of the at least one server system and the preceding one of the linked file repositories, and
if the new one of the at least one version of the file to be written does not exist in the one of the linked file repositories:
  storing the new one of the at least one version of the file to be written from the one of the linked file repositories.

5. The method of claim 4, further including implementing the version-recovery process by performing one of:
  receiving the read operation and a version number of a requested version of the file to be read from the at least one server system,
  examining the version number of the file to be read, and
  determining if the requested version of the file to be read exists in one of the linked file repositories having a position number matching the received version number, wherein if the requested version of the file to be read exists:
    reading and sending the file to a requesting server system, otherwise
  indicating a file read-error to the requesting server system if the requested version of the file to be read does not exist.

6. The method of claim 1, further including implementing the version-recovery process on the block-differential basis by performing one of:
  receiving a read operation and a version number of a requested version of the file to be read from the at least one server system,
  examining the version number of the file to be read;
  determining if the requested version of the file to be read exists in one of the linked file repositories having the position number matching the received version number,
  if the requested version of the file to be read exists, recreating the requested version of the file to be read by determining if the requested version of the file to be read is a most recent version of the at least one version of the file to be read,
  if the requested version of the file to be read is the most recent version of the at least one version of the file to be read:
    reading and sending the most recent version of the at least one version of the file to be read from a first one of the linked file repositories to a requesting server system, otherwise performing one of:
      reading content of the linked file repositories having the position number that is one of less than and equal to the requested version number of the at least one version of the file to be read,
      replacing the different data blocks of the most recent version of the at least one version of the file to be read with the different data blocks of an older version of the at least one version of the file, and
      sending a recreated version of the file to be read to the requesting server system, and
  indicating a file read-error to the requesting server system if the requested version of the file does not exists.

7. A system for data backup and recovery based on linked file repositories, wherein the system includes at least one of:
  at least one server system;
  the linked file repositories, wherein each of the linked file repositories representing an individual file system capable of storing at least one version of a file, and in communication with the at least one server system; and
  at least one processor device, in communication with each the linked file repositories and the at least one server system, operable in the system, wherein the at least one processor device:
    places each of the linked file repositories in one of a plurality of positions for storing the at least one version of the file,
    continuously numbers each of the plurality of positions of each of the linked file repositories,
    determines a number of the at least one version of the file by the one of a plurality of positions of the one of the linked file repositories,
    for each of the linked file repositories, performs at least one function operation for each file stored in the linked file repositories matching at least one rule, wherein the at least one function operation includes at least one of a deduplication function allowing deduplicating files based on the version number, an indexing function allowing to index the file and providing search and discovery capabilities, and an expiration function for moved files determining when a moved file expires and is being deleted time-based or event-based; wherein the at least one rule includes a file extension matching a certain pattern, a file name matching one of a plurality of patterns, a file path name matching the one of a plurality of patterns, a file owner matching the one of a plurality of patterns, a file creation, and a modification or last access time matching a specified date and a specified time range, and
    implements the version-recovery process on a block-differential basis by performing one of:
    receiving a write operation with a new one of the at least one version of the file to be written from one of the at least one server system and a preceding one of the linked file repositories,
    determining if the new one of the at least one version of the file to be written exists in the one of the linked file repositories,
    if the new one of the at least one version of the file to be written exists in the one of the linked file repositories performing one of:
      comparing data of the new one of the at least one version of the file to be written and an existing one of the at least one version of the of the file to be written,
      determining different data blocks,
      moving the different data blocks from the existing one of the at least one version of the of the file to be written from the one of the linked file repositories to a subsequent one of the linked file repositories if versioning policies indicate a higher number of the at least one version as compared to a position number of the one of the linked file repositories, otherwise:

deleting the different data blocks of the existing one of the at least one version in the one of the linked file repositories, and storing the different data blocks of the new one of the at least one version of the file to be written from one of the at least one server system and the preceding one of the linked file repositories, and if the at least one version of the file to be written does not exist in the one of the linked file repositories:

storing the new one of the at least one version of the file to be written from one of the linked file repositories, includes the version number and a file name of the requested version of the file to be read as part of the read operation, wherein the requested version number is one of an integer number, a date range, and a time range, and sets the version number of the requested version as a file attribute prior to the read operation.

8. The system of claim 7, wherein the at least one processor device implements a version-recovery process over each of the linked file repositories to perform a read operation of the at least one version of the file.

9. The system of claim 7, wherein the at least one processor device continuously numbers each of the plurality of positions of each of the linked file repositories beginning at a numerical value of 1, wherein a first one of the linked file repositories is numbered as 1, and a first version of the at least one version of the file representing a most recent version of the file is stored.

10. The system of claim 7, wherein the at least one processor device implements the version-recovery process by performing one of:

receiving a write operation and a new one of the at least one version of the file to be written from one of the at least one server system and a preceding one of the linked file repositories, determining if the new one of the at least one version of the file to be written exists in the one of the linked file repositories, if the new one of the at least one version of the file to be written exists in the one of the linked file repositories performing one of:

verifying versioning policies, moving an existing one of the at least one version from the corresponding one of the linked file repositories to a subsequent one of the linked file repositories if the versioning policies indicate a higher number of the at least one version that are to be saved as compared to a position number of the one of the linked file repositories, otherwise:

deleting the existing one of the at least one version in the one of the linked file repositories, and storing the new one of the at least one version of the file to be written from one of the at least one server system and the preceding one of the linked file repositories, and if the new one of the at least one version of the file to be written does not exist in the one of the linked file repositories:

storing the new one of the at least one version of the file to be written from the one of the linked file repositories.

11. The system of claim 10, wherein the at least one processor device implements the version recovery process by performing one of:

receiving the read operation and a version number of a requested version of the file to be read from the at least one server system, examining the version number of the file to be read, and determining if the requested version of the file to be read exists in one of the linked file repositories having a position number matching the received version number, wherein if the requested version of the file to be read exists:

reading and sending the file to a requesting server system, otherwise indicating a file read-error to the requesting server system if the requested version of the file to be read does not exist.

12. The system of claim 7, wherein the at least one processor device implements the version-recovery process on the block-differential basis by performing one of:

receiving a read operation and a version number of a requested version of the file to be read from the at least one server system, examining the version number of the file to be read, determining if the requested version of the file to be read exists in one of the linked file repositories having the position number matching the received version number, if the requested version of the file to be read exists, recreating the requested version of the file to be read by determining if the requested version of the file to be read is a most recent version of the at least one version of the file to be read, if the requested version of the file to be read is the most recent version of the at least one version of the file to be read, reading and sending the most recent version of the at least one version of the file to be read from a first one of the linked file repositories to a requesting server system, otherwise performing one of:

reading content of the linked file repositories having the position number that is one of less than and equal to the requested version number of the at least one version of the file to be read, replacing the different data blocks of the most recent version of the at least one version of the file to be read with the different data blocks of an older version of the at least one version of the file, and sending a recreated version of the file to be read to the requesting server system, and indicating a file read-error to the requesting server system if the requested version of the file does not exist.

13. A computer program product of data backup and recovery based on linked file repositories with each of the linked file repositories representing an individual file system capable of storing at least one version of a file and being connected to at least one server system, the computer program product comprising a non-transitory computer-readable storage medium having computer-readable program code portions stored therein, the computer-readable program code portions comprising:

an executable portion that places each of the linked file repositories in one of a plurality of positions for storing the at least one version of the file;

an executable portion that continuously numbers each of the plurality of positions of each of the linked file repositories;

an executable portion that determines a number of the at least one version of the file by the one of a plurality of positions of the one of the linked file repositories;

an executable portion that, for each of the linked file repositories, performs at least one function operation for each file stored in the linked file repositories matching at least one rule, wherein the at least one function operation includes at least one of a deduplication function allowing deduplicating files based on the version number, an indexing function allowing to index the file and providing search and discovery capabilities, and an expiration function for moved files determining when a moved file expires and is being deleted time-based or event-based; wherein the at least one rule includes a file extension matching a certain pattern, a file name matching one of a plurality of patterns, a file path name matching the one of a plurality of patterns, a file owner matching the one of a plurality of patterns, a file creation, and a modification or last access time matching a specified date and a specified time range; and an executable portion that implements the version-recovery process on a block-differential basis by performing one of:

receiving a write operation with a new one of the at least one version of the file to be written from one of the at least one server system and a preceding one of the linked file repositories, determining if the new one of the at least one version of the file to be written exists in the one of the linked file repositories, if the new one of the at least one version of the file to be written exists in the one of the linked file repositories performing one of:

comparing data of the new one of the at least one version of the file to be written and an existing one of the at least one version of the of the file to be written, determining different data blocks, moving the different data blocks from the existing one of the at least one version of the of the file to be written from the one of the linked file repositories to a subsequent one of the linked file repositories if versioning policies indicate a higher number of the at least one version as compared to a position number of the one of the linked file repositories, otherwise:

deleting the different data blocks of the existing one of the at least one version in the one of the linked file repositories, and storing the different data blocks of the new one of the at least one version of the file to be written from one of the at least one server system and the preceding one of the linked file repositories, and if the at least one version of the file to be written does not exist in the one of the linked file repositories:

storing the new one of the at least one version of the file to be written from the one of the linked file repositories;

an executable portion that includes the version number and a file name of the requested version of the file to be read as part of the read operation, wherein the requested version number is one of an integer number, a date range, and a time range, and an executable portion that sets the version number of the requested version as a file attribute prior to the read operation.

14. The computer program product of claim 13, further including an executable portion that implements a version-movement process over each of the linked file repositories to perform a read operation of the at least one version of the file.

15. The computer program product of claim 13, further including an executable portion that continuously numbers each of the plurality of positions of each of the linked file repositories beginning at a numerical value of 1, wherein a first one of the linked file repositories is numbered as 1, and a first version of the at least one version of the file representing a most recent version of the file is stored.

16. The computer program product of claim 13, further including an executable portion that implements the version-recovery process by performing one of:

receiving a write operation and a new one of the at least one version of the file to be written from one of the at least one server system and a preceding one of the linked file repositories, determining if the new one of the at least one version of the file to be written exists in the one of the linked file repositories, if the new one of the at least one version of the file to be written exists in the one of the linked file repositories performing one of:

verifying versioning policies, moving an existing one of the at least one version from the corresponding one of the linked file repositories to a subsequent one of the linked file repositories if the versioning policies indicate a higher number of the at least one version that are to be saved as compared to a position number of the one of the linked file repositories, otherwise:

deleting the existing one of the at least one version in the one of the linked file repositories, and storing the new one of the at least one version of the file to be written from one of the at least one server system and the preceding one of the linked file repositories, and if the new one of the at least one version of the file to be written does not exist in the one of the linked file repositories:

storing the new one of the at least one version of the file to be written from the one of the linked file repositories.

17. The computer program product of claim 16, further including an executable portion that implements the version recovery process by performing one of:

receiving the read operation and a version number of a requested version of the file to be read from the at least one server system, examining the version number of the file to be read, determining if the requested version of the file to be read exists in one of the linked file repositories having a position number matching the received version number, wherein if the requested version of the file to be read exists:

reading and sending the file to a requesting server system, otherwise indicating a file read-error to the requesting server system if the requested version of the file to be read does not exist.

18. The computer program product of claim 13, further including an executable portion that implements the version-recovery process on the block-differential basis by performing one of:

receiving a read operation and a version number of a requested version of the file to be read from the at least one server system, examining the version number of the file to be read, determining if the requested version of the file to be read exists in one of the linked file repositories having the position number matching the received version number, if the requested version of the file to be read exists, recreating the requested version of the file to be read by determining if the requested version of the file to be read is a most recent version of the at least one version of the file to be read, if the requested version of the file to be read is the most recent version of the at least one version of the file to be read, reading and sending the most recent version of the at least one version of the file to be read from a first one of the linked file repositories to a requesting server system, otherwise performing one of:

reading content of the linked file repositories having the position number that is one of less than and equal to the requested version number of the at least one version of the file to be read, replacing the different data blocks of the most recent version of the at least one version of the file to be read with the different data blocks of an older version of the at least one version of the file, and sending a recreated version of the file to be read to the requesting server system, and indicating a file read-error to the requesting server system if the requested version of the file does not exists.

\* \* \* \* \*